Patented Dec. 23, 1941

2,266,830

UNITED STATES PATENT OFFICE 2,266,830

EXTRACTION OF VITAMINS FROM VITAMIN-BEARING OILS

Harden F. Taylor, Arthur W. Wells, and Vladimir A. Nedzvedsky, New York, N. Y., assignors to The Atlantic Coast Fisheries Company, New York, N. Y., a corporation of Maine No Drawing. Application July 6, 1938, Serial No. 217,728

19 Claims. (Cl. 167—81)

This invention relates to a process of extraction of vitamin A or vitamin D, or both, simultaneously in a more or less refined state from fish liver oils or oils containing these vitamins.

Various procedures of concentrating the fat-soluble vitamins are known in the prior art. All of these prior art procedures prepared the oil for the extraction of vitamins by the use of violent agents and under violent conditions (excessive heat). As a consequence, considerable and appreciable destruction of these labile substances occurred and, as a rule, efficiency ranging from 60% to 85% recovery of the biologically active vitamins were obtained.

The instant invention overcomes the aforementioned difficulties by employing a more gentle procedure of preparing the oil for the extraction of the vitamins and extracting said vitamins in such a manner that a very high yield of vitamins is obtained, with relatively slight loss from cyclization, pyrolysis and other damage done by the prior art procedures utilizing excessive heat and other violent agents.

The nature and objects of the instant invention will become apparent from the following description and appended claims.

In accordance with the principles of this invention, an oil containing vitamin A or vitamin D, or both, is, as hereafter more fully explained, gently saponified, either wholly or partially as desired, with the necessary quantity of alkali to produce the desired degree of saponification. After saponification has been completed, the resulting soap is comminuted, as by grating, shredding, or otherwise breaking up into small pieces, under conditions which inhibit the oxidation and destruction of the vitamins. The comminuted soap is treated with a fat solvent and subjected to a very thorough and further disintegrating process so as to bring the fat solvent into the most intimate contact with every part of the soap. By this procedure substantially all of the unsaponifiable matter in the oil, including the vitamins, is transferred to and dissolved in the solvent.

As hereafter more fully explained, the solution of unsaponifiable matter in the fat solvent after separation and removal from the soap is appropriately treated to yield the unsaponifiable matter and recover the solvent.

The manner in which the saponification of the saponifiable matter in the oil is to be effected is one of the important features of this invention. As previously stated, it is effected with agents and under conditions which avoid the use of violent agents and excessive heat and which, for lack of appropriate terminology, we term "gentle saponification."

In carrying out the saponification, the requisite quantity of alkali is dissolved in an appropriate quantity of water. This solution in the freshly prepared state will be warm, due to the heat of solution of the alkali in the water.

The aqueous alkali solution in the freshly prepared state is intimately mixed with the selected oil containing the vitamins, and it is to be noted that no other heat (extraneous heat) and no catalyst or catalytic agent is employed to promote saponification. When proper proportions of oil and the aqueous alkali solution are employed, saponification will be completed in the course of several hours. Because of the mildness of the saponification process, the vitamins are not injured.

In the preferred form of the invention, the aqueous alkali solution is dispersed in the oil. Though this may be secured by various ways of mixing, we prefer to accomplish this result by the use of a colloid mill. When a colloid mill is employed, the warm aqueous alkali solution and the oil are simultaneously and separately fed, in proportions to their respective volumes, to the colloid mill.

It may be found desirable to carry out the saponification process in such a manner that the oil will be only partially or incompletely saponified. This has an advantage in the fact that the finished product exists largely in the form of an ester, in which form it appears to be somewhat more efficacious biologically than when in the form of an alcohol, as it exists after the oils have been completely saponified.

The quantity of aqueous alkali solution and the concentration thereof depend on the quantity of oil to be treated, as well as whether the saponifiable matter is to be wholly or partially saponified. It is manifest that a person skilled in the art can readily determine the proper concentration and quantities by several empirical tests.

The following example sets forth in illustrative embodiment when complete saponification of the saponifiable matter is desired:

| | Grams |
|---|---|
| Fish liver oil containing 10,000 units of vitamin A per gram | 1,000 |
| Sodium hydroxide | 200 |
| Water | 500 |

The following example sets forth in illustrative embodiment when partial saponification of the saponifiable matter is desired:

| | Grams |
|---|---|
| Fish liver oil containing 10,000 units of vitamin A per gram | 1,000 |
| Sodium hydroxide | 140 |
| Water | 500 |

If desired, in each of the foregoing examples the molecular equivalent of potassium hydroxide may be used in place of sodium hydroxide.

The comminution of the soap is, as previously mentioned, carried out under conditions so that the soap will be exposed to the air as little as possible and for as short a period of time as possible, especially after the soap has been comminuted, because exposure of the very large aggregate area of surface results in quick oxidation and destruction of vitamin A. Satisfactory results are secured when the comminution is effected under non-oxidizing conditions, such as in the presence of an inert gas. In the preferred form of the invention, the soap is comminuted under the surface of the fat solvent. The composition of the solvent and the comminuted soap is then subjected to a very thorough mixing and further disintegrating process to bring the solvent in most intimate contact with every particle of soap. A most practical and convenient procedure is to flow the solvent and particles of soap suspended therein into a colloid mill which grinds the soap in the presence of the solvent and whereby substantially all of the unsaponifiable matter, including the vitamins, is transferred to and dissolved in the solvent.

For reasons which will become apparent from the following description, the preferred solvent for the unsaponifiable matter is one which has a specific gravity higher than soap and brine. Methylene chloride is particularly preferred because of its extreme stability in the presence of caustic soda, harmlessness to workers, non-inflammability, its low solubility in water, its low boiling point, and its non-corrosive properties.

The quantity of solvent employed in the process varies with the oil, the degree of saponification, etc. Satisfactory results have been obtained when a quantity of methylene chloride equal to from 5 to 10 times the volume of the soap is used.

The efficiency of the process is determined by the completeness with which the solvent and the unsaponifiable matter dissolved therein can be removed from the soap. In one embodiment of the invention, the disintegrated mass of soap and solvent is introduced into a vapor-tight tank constructed of an alkali-resisting material where the soap is salted out by the addition of an appropriate quantity of an aqueous sodium chloride solution and the entire mass is agitated by suitable mechanical equipment. Due to the fact that the fat solvent is of substantially greater specific gravity than that of the brine and soap, the solvent, together with the unsaponifiable matter dissolved therein, will subside in a layer to the bottom of the container, while the soap and brine together will rise to the top.

Obviously, the quantity and concentration of the aqueous sodium chloride solution varies with the quantity of soap in the mass. Usually, a quantity of 50% saturated aqueous sodium chloride solution approximately equal to twice the volume of the original soap is added.

The solution of the solvent containing the unsaponifiable matter may be drawn off from below and subjected to distillation, whereby the vitamins and other unsaponifiable matter will be separated from the solvent, the latter being recovered. Separation of the solution of solvent containing the unsaponifiable matter from the brine and soap under the influence of gravity will never be complete. Briefly, we have found that about 77% to 80% of the solvent separates spontaneously in the course of a few hours. Thus, about 20% to 23% of the unsaponifiable matter still remains in the soap-brine mixture. Hence, a second quantity of pure fat solvent equal in volume to the amount drawn off is now added to the soap and the resulting mass agitated, after which the mixture is allowed to settle by gravity. The second batch of solvent, together with the unsaponifiable matter dissolved therein, is then withdrawn from below and subjected to distillation, as previously described, or it may be used for the first extraction of a fresh batch of soap. While using the second pull-off of solvent for the first extraction of the fresh batch of soap, great economy is brought about in the volume of solvent to be handled, distilled, etc.

Instead of separating the solvent containing the unsaponifiable matter from the soap and brine by gravity, as above explained, the separation may be effected by centrifuging the entire mass of soap-solvent-brine. In this procedure, after the soap has been salted out, the entire resulting mass, after being agitated, is passed through a high-speed centrifuge. Ordinarily, we have found that we do not get a substantially greater recovery of solvent from the soap by this procedure than is obtained by the gravity separation. Although the soap remaining after the centrifuging may be washed and again centrifuged as many times as desired, we have found that two washes of the soap with solvent will yield upwards of 90% efficiency in the recovery of the vitamins.

When the solvent is distilled off the unsaponified matter, the latter may be recovered in its crude state as such, or a carrier oil, such as sesame, soya bean, peanut, cottonseed, etc. oil may be added in a small quantity to the solvent near the end of the distillation. This procedure carries the advantage that at no time is the pure unsaponified matter directly exposed to oxidation.

If desired, a further measure of refinement may be carried out by distilling over substantially all of the methylene chloride and re-dissolving the concentrate in another solvent, such as ethyl acetate, in which cholesterol is of low solubility at relatively low temperature. In carrying out this modification of the process, the crude concentrate is dissolved in two or three volumes of ethyl acetate and the solution containing the concentrate refrigerated to a low temperature, whereby the cholesterol crystallizing out may be separated by filtration. The ethyl acetate is distilled from the filtrate, the distilling operation being performed with or without the addition of a carrier oil, as indicated above.

Reference is made in the early part of this specification to the employment of very gentle means at all stages of the process. Since methylene chloride has a boiling point of 39.8° C., the entire volume of solvent can be distilled off the concentrate at a temperature not exceeding 40° C. at any stage of the distillation and without the use of vacuum pumps, condensers, and the like, and with relatively slight loss of solvent. Substantially all of the solvent is removed at atmospheric pressure as above indicated. Concentrate will, nevertheless, always contain residual traces of solvent, together with other volatile materials having odor and taste, which should be removed. This step is carried out in vacuum of 1 to 10 mil. Hg pressure and at a temperature of about 40° to 50° C. while bubbling an inert gas, such as carbon dioxide, or unsaturated water vapor through it.

The vitamin concentrates obtained by the process herein described are characterized by a color considerably lighter and less intense than those which characterize vitamin concentrates obtained by the prior art process. The red coloration of the vitamin concentrates of the prior art is probably due to polymerization and oxidation reactions which are substantially reduced or materially inhibited in the instant process.

Since it is obvious that various changes and modifications may be made in the above description without departing from the nature or spirit thereof, this invention is not restricted thereto except as set forth in the appended claims.

We claim:

1. A method of extracting vitamins from oil containing the same which comprises intimately mixing the oil containing the vitamins and a freshly prepared aqueous solution of an alkali to effect the desired saponification of the saponifiable matter in said oil, comminuting the resulting soap under conditions inhibiting appreciable and substantial oxidation, intimately mixing the comminuted soap with methylene chloride whereby the unsaponified matter is dissolved therein, salting out the soap, separating the soap and brine from the solution of methylene chloride containing the unsaponified matter, and separating the unsaponified matter from the methylene chloride.

2. A method of extracting vitamins from oil containing the same which comprises dispersing a freshly prepared aqueous solution of an alkali in the oil containing the vitamins to effect the desired saponification of the saponifiable matter in said oil, comminuting the resulting soap under conditions inhibiting appreciable and substantial oxidation, intimately mixing the comminuted soap with methylene chloride whereby the unsaponified matter is dissolved therein, salting out the soap, separating the soap and brine from the solution of methylene chloride containing the unsaponified matter, and separating the unsaponified matter from the methylene chloride.

3. A method of extracting vitamins from oil containing the same which comprises intimately mixing the oil containing the vitamins and a freshly prepared aqueous solution of an alkali at a temperature produced by the heat of solution of the alkali in the water to effect the desired saponification of the saponifiable matter in said oil, the mixing being performed in the absence of other heat and catalysts, comminuting the resulting soap under conditions inhibiting appreciable and substantial oxidation, intimately mixing the comminuted soap with methylene chloride whereby the unsaponified matter is dissolved therein, salting out the soap, separating the soap and brine from the solution of methylene chloride containing the unsaponified matter, and separating the unsaponified matter from the methylene chloride.

4. A method of extracting vitamins from oil containing the same which comprises dispersing a freshly prepared aqueous solution of an alkali at a temperature produced by the heat of solution of the alkali in the water in oil containing the vitamins to effect the desired saponification of the saponifiable matter in said oil, the dispersing being effected in the absence of other heat and catalysts, comminuting the resulting soap under conditions inhibiting appreciable and substantial oxidation, intimately mixing the comminuted soap with methylene chloride whereby the unsaponified matter is dissolved therein, salting out the soap, separating the soap and brine from the solution of methylene chloride containing the unsaponified matter, and separating the unsaponified matter from the methylene chloride.

5. A method of extracting vitamins from oil containing the same which comprises dispersing a freshly prepared aqueous solution of an alkali at a temperature produced by the heat of solution of the alkali in the water in oil containing the vitamins to effect the desired saponification of the saponifiable matter in said oil, the dispersing being effected in the absence of other heat and catalysts, comminuting the resulting soap in the presence of and under the surface of methylene chloride, intimately mixing the comminuted soap with the methylene chloride whereby the unsaponified matter is dissolved therein, salting out the soap, separating the soap and brine from the solution of methylene chloride containing the unsaponified matter, and separating the unsaponified matter from the methylene chloride.

6. A method of extracting vitamins from oil containing the same which comprises dispersing a freshly prepared aqueous solution of an alkali at a temperature produced by the heat of solution of the alkali in the water in oil containing the vitamins to effect the desired saponification of the saponifiable matter in said oil, the dispersing being effected in the absence of other heat and catalysts, comminuting the resulting soap in the presence of and under the surface of methylene chloride, passing the resulting composition through a colloid mill, salting out the soap, separating the soap and brine from the solution of methylene chloride containing the unsaponified matter, and separating the unsaponified matter from the methylene chloride.

7. A method of extracting vitamins from oils containing the same which comprises simultaneously feeding the oil containing the vitamins and a freshly prepared solution of an alkali at a temperature produced by the heat of solution of the alkali in water and in proportion to their respective volumes to a colloid mill whereby the alkali solution is intimately dispersed in the oil, permitting saponification of the saponifiable matter to proceed to the desired degree, the dispersing and saponification being effected in the absence of other extraneous heat and catalysts, comminuting the resulting soap under conditions inhibiting appreciable oxidation, intimately mixing the comminuted soap with methylene chloride whereby the unsaponified matter is dissolved in said methylene chloride, salting out the soap, separating the soap and brine from the solution of methylene chloride containing the unsaponified matter, and separating the unsaponified matter from the methylene chloride.

8. A method of extracting vitamins from oils containing the same which comprises simultaneously feeding the oil containing the vitamins and a freshly prepared solution of an alkali at a temperature produced by the heat of solution of the alkali in water and in proportion to their respective volumes to a colloid mill whereby the alkali solution is intimately dispersed in the oil, permitting saponification of the saponifiable matter to proceed to the desired degree, the dispersing and saponification being effected in the absence of other extraneous heat and catalysts, comminuting the resulting soap in the presence of and under the surface of methylene chloride to inhibit appreciable oxidation, intimately mixing the comminuted soap with said methylene chloride whereby the unsaponified matter is dissolved in said methylene chloride, salting out the soap, separating the soap and brine from the solution of methylene containing the unsaponified matter, and separating the unsaponified matter from the methylene chloride.

9. A method of extracting vitamins from oils containing the same which comprises simultaneously feeding the oil containing the vitamins and a freshly prepared solution of an alkali at a temperature produced by the heat of solution of the alkali in water and in proportion to their respective volumes to a colloid mill whereby the alkali solution is intimately dispersed in the oil, permitting saponification of the saponifiable matter to proceed to the desired degree, the dispersing and saponification being effected in the absence of other extraneous heat and catalysts, comminuting the resulting soap in the presence of and under the surface of methylene chloride to inhibit appreciable oxidation, passing the resulting mixture through a colloid mill whereby the unsaponified matter is dissolved in said methylene chloride, salting out the soap, separating the soap and brine from the solution of methylene chloride containing the unsaponified matter, and separating the unsaponified matter from the methylene chloride.

10. A method of extracting vitamins from oils containing the same which comprises simultaneously feeding the oil containing the vitamins and a freshly prepared solution of an alkali at a temperature produced by the heat of solution of the alkali in water and in proportion to their respective volumes to a colloid mill whereby the alkali solution is intimately dispersed in the oil, permitting saponification of the saponifiable matter to proceed to the desired degree, the dispersing and saponification being effected in the absence of other extraneous heat and catalysts, comminuting the resulting soap in the presence of and under the surface of methylene chloride, passing the resulting mixture through a colloid mill whereby the unsaponified matter is dissolved in said methylene chloride, salting out the soap, centrifuging the mass at a high speed whereby the soap and brine are removed from the solution of methylene chloride containing the unsaponified matter, and separating the unsaponified matter from the methylene chloride.

11. A method of extracting vitamins from oils containing the same which comprises simultaneously feeding the oil containing the vitamins and a freshly prepared solution of an alkali at a temperature produced by the heat of solution of the alkali in water and in proportion to their respective volumes to a colloid mill whereby the alkali solution is intimately dispersed in the oil, permitting saponification of the saponifiable matter to proceed to the desired degree, the dispersing and saponification being effected in the absence of other extraneous heat and catalysts, comminuting the resulting soap in the presence of and under the surface of methylene chloride, passing the resulting mixture through a colloid mill whereby the unsaponified matter is dissolved in said methylene chloride, salting out the soap, permitting the mass to stand whereby the solution of methylene chloride containing the unsaponified matter will subside to the bottom and the brine and soap will rise to the top, drawing off the said solution of methylene chloride, and separating the unsaponified matter from said methylene chloride.

12. A method of extracting vitamins from oils containing the same which comprises dispersing a freshly prepared aqueous solution of an alkali at a temperature produced by the heat of solution of the alkali in water in oil containing the vitamins to effect the desired degree of saponification of the saponifiable matter in said oil, the dispersing being effected in the absence of other heat and catalysts, comminuting the resulting soap in the presence of and under the surface of methylene chloride, passing the resulting composition through a colloid mill whereby the unsaponified matter is dissolved in said methylene chloride, salting out the soap, centrifuging the mass at a high speed whereby the soap and brine are removed from the solution of methylene chloride containing the unsaponified matter, and separating the unsaponified matter from the methylene chloride.

13. A method of extracting vitamins from oils containing the same which comprises dispersing a freshly prepared aqueous solution of an alkali at a temperature produced by the heat of solution of the alkali in water in oil containing the vitamins to effect the desired degree of saponification of the saponifiable matter in said oil, the dispersing being effected in the absence of other heat and catalysts, comminuting the resulting soap in the presence of and under the surface of methylene chloride, passing the resulting composition through a colloid mill whereby the unsaponified matter is dissolved in said methylene chloride, salting out the soap, permitting the mass to stand whereby the solution of methylene chloride containing the unsponified matter will subside to the bottom and the brine and soap will rise to the top, drawing off the solution of methylene chloride containing the unsaponified matter, and separating the unsaponified matter from the methylene chloride.

14. A method of extracting vitamins from oils containing the same which comprises simultaneously feeding the oil containing the vitamins and a freshly prepared solution of an alkali at a temperature produced by the heat of solution of the alkali in water and in proportion to their respective volumes to a colloid mill whereby the alkali solution is intimately dispersed in the oil, permitting saponification of the saponifiable matter to proceed to the desired degree, the dispersing and saponification being effected in the absence of other extraneous heat and catalysts, comminuting the resulting soap in the presence of and under the surface of methylene chloride, passing the resulting mixture through a colloid mill whereby the unsaponified matter is dissolved in said methylene chloride, salting out the soap, centrifuging the mass at a high speed whereby the soap and brine are removed from the solution of methylene chloride containing the unsaponified matter, and separating the unsponified matter from the methylene chloride.

15. A method of extracting vitamins from oils containing the same which comprises simultaneously feeding the oil containing the vitamins and a freshly prepared solution of an alkali at a temperature produced by the heat of solution of the alkali in water and in proportion to their respective volumes to a colloid mill whereby the alkali solution is intimately dispersed in the oil, permitting saponification of the saponifiable matter to proceed to the desired degree, the dispersing and saponification being effected in the absence of other extraneous heat and catalysts, comminuting the resulting soap in the presence of and under the surface of methylene chloride, passing the resulting mixture through a colloid mill whereby the unsaponified matter is dissolved in said methylene chloride, salting out the soap, permitting the mass to stand whereby the solution of methylene chloride containing the unsaponified matter will subside to the bottom and the brine and soap will rise to the top, drawing off the said solution of methylene chloride, and separating the unsaponified matter from said metylene chloride.

16. A method of extracting vitamins from oils containing the same which comprises simultaneously feeding in proportion to their respective volumes 1,000 parts of a fish liver oil and a freshly prepared solution consisting essentially of 140 to 200 parts of sodium hydroxide and 500 parts of water at a temperature produced by the heat of solution of said alkali in said water to a colloid mill whereby the alkali solution is intimately dispersed in the oil, permitting saponification of the saponifiable matter to proceed to the desired degree, the dispersing and saponification being effected in the absence of other extraneous heat and catalysts, comminuting the resulting soap in the presence of a quantity of methylene chloride approximately 5 to 10 times the volume of said soap, passing the resulting mixture through a colloid mill, adding a 50% saturated sodium chloride solution in an amount approximately twice the volume of the original soap, centrifuging the mass at a high speed whereby the soap and brine are separated from the solution of methylene chloride containing the unsaponified matter, and separating the unsaponified matter from the methylene chloride.

17. A method of extracting vitamins from oils containing the same which comprises simultaneously feeding in proportion to their respective volumes 1,000 parts of a fish liver oil and a freshly prepared solution consisting essentially of 140 to 200 parts of sodium hydroxide and 500 parts of water at a temperature produced by the heat of solution of said alkali in said water to a colloid mill whereby the alkali solution is intimately dispersed in the oil, permitting saponification of the saponifiable matter to proceed to the desired degree, the dispersing and saponification being effected in the absence of other extraneous heat and catalysts, comminuting the resulting soap in the presence of a quantity of methylene chloride approximately 5 to 10 times the volume of said soap, passing the resulting mixture through a colloid mill, adding a 50% saturated sodium chloride solution in an amount approximately twice the volume of the original soap, permitting the mass to stand whereby the solution of methylene chloride containing the unsaponified matter will subside to the bottom and the soap and brine will rise to the top, drawing off the methylene chloride solution, and separating the unsaponified matter from the methylene chloride.

18. The method of extracting vitamins from oils containing the same which comprises saponifying the oil containing the vitamins with an alkali to form a soap of the saponifiable matter in said oil, treating the soap with methylene chloride whereby the unsaponified matter is dissolved therein, separating the soap from the solution of methylene chloride containing the unsaponified matter, and separating the unsaponified matter from the methylene chloride.

19. The method of extracting vitamins from oils containing the same which comprises saponifying the oil containing the vitamins with an alkali to form a soap of the saponifiable matter in said oil, treating the resulting soap with methylene chloride, passing the resulting mass through a colloid mill whereby the unsaponified matter is dissolved in said methylene chloride, separating the soap from the solution of methylene chloride containing the unsaponified matter, and separating the unsaponified matter from the methylene chloride.

HARDEN F. TAYLOR.
ARTHUR W. WELLS.
VLADIMIR A. NEDZVEDSKY.

CERTIFICATE OF CORRECTION.

Patent No. 2,266,830. December 23, 1941.

HARDEN F. TAYLOR, ET AL.

It is hereby certified that error appears in the printed specification of the above numbered patent requiring correction as follows: Page 2, first column, line 8, for "in" read --an--; page 4, first column, line 18, claim 8, after "methylene" insert --chloride--; second column, line 48, claim 13, and line 74-75, claim 14, for "unsponified" read --unsaponified--; page 5, first column, line 24, claim 15, for "metylene" read --methylene--; and that the said Letters Patent should be read with this correction therein that the same may conform to the record of the case in the Patent Office.

Signed and sealed this 17th day of March, A. D. 1942.

(Seal)

Henry Van Arsdale,
Acting Commissioner of Patents.